(12) United States Patent
Overstreet

(10) Patent No.: US 11,189,164 B2
(45) Date of Patent: Nov. 30, 2021

(54) MODIFYING OPERATIONAL SETTINGS OF A TRAFFIC SIGNAL

(71) Applicant: Cubic Corporation, San Diego, CA (US)

(72) Inventor: William S. Overstreet, Knoxville, TN (US)

(73) Assignee: Cubic Corporation, San Diego, CA (US)

( * ) Notice: Subject to any disclaimer, the term of this patent is extended or adjusted under 35 U.S.C. 154(b) by 271 days.

(21) Appl. No.: 16/395,033

(22) Filed: Apr. 25, 2019

(65) Prior Publication Data

US 2019/0333374 A1    Oct. 31, 2019

Related U.S. Application Data

(60) Provisional application No. 62/664,002, filed on Apr. 27, 2018.

(51) Int. Cl.
*G08G 1/07*      (2006.01)
*G06F 21/32*      (2013.01)
(Continued)

(52) U.S. Cl.
CPC ............. *G08G 1/07* (2013.01); *G06F 21/32* (2013.01); *G06F 21/62* (2013.01);
(Continued)

(58) Field of Classification Search
CPC ............ G06F 21/32; G06F 21/62–629; G06F 2221/2137; G06F 2221/2141; G08G 1/07; G07C 9/00182; G07C 2009/0019
See application file for complete search history.

(56) References Cited

U.S. PATENT DOCUMENTS 8,370,639 B2    2/2013   Azar et al.
9,442,446 B2    9/2016   Kawakami et al.
(Continued)

FOREIGN PATENT DOCUMENTS

KR    20140122101 A   * 10/2014   ......... G07C 9/00309

OTHER PUBLICATIONS

Ghena, Branden, et al. "Green lights forever: Analyzing the security of traffic infrastructure." 8th {USENIX} Workshop on Offensive Technologies ({WOOT} 14). 2014. (Year: 2014).*

*Primary Examiner* — Madhuri R Herzog
(74) *Attorney, Agent, or Firm* — Kilpatrick Townsend & Stockton, LLP

(57) ABSTRACT

The present disclosure is directed to methods and apparatus that manage the flow of traffic. Methods and systems consistent with the present disclosure may allow biometric information of individuals to be collected when access privileges associated with particular individuals are validated or updated. These methods may allow a supervisor to temporarily or permanently authorize certain employees to access components that are located within a traffic control cabinet and these methods may allow changes in traffic signal light timing to be authorized according to a set of rules. Such authorization rules may require proposed signal light timing changes to be approved by a supervisor before a proposed change is implemented. Methods and systems consistent with the present disclosure may also cause components within a control cabinet to be disabled or disconnected when a signal light control cabinet is accessed by unauthorized persons.

20 Claims, 10 Drawing Sheets

(51) Int. Cl.
  *G07C 9/00* (2020.01)
  *G06F 21/62* (2013.01)
(52) U.S. Cl.
  CPC .. *G07C 9/00182* (2013.01); *G06F 2221/2137* (2013.01); *G07C 2009/0019* (2013.01)

(56) References Cited

U.S. PATENT DOCUMENTS

| | | | |
|---|---|---|---|
| 2005/0216748 A1* | 9/2005 | Yeung et al. | G06F 21/70 713/187 |
| 2010/0111377 A1 | 5/2010 | Monroe | |
| 2010/0171640 A1* | 7/2010 | Delia | G08G 1/07 340/907 |
| 2010/0225441 A1 | 9/2010 | Fisher | |
| 2012/0112928 A1* | 5/2012 | Nishimura et al. | G08G 1/07 340/909 |
| 2013/0285840 A1* | 10/2013 | Allen et al. | G08G 1/07 340/923 |
| 2015/0278499 A1 | 10/2015 | Levitov | |
| 2017/0006044 A1* | 1/2017 | Ezra et al. | G06F 21/31 |
| 2019/0334922 A1* | 10/2019 | Ratiner et al. | H04L 63/102 |

\* cited by examiner

Municipality Traffic Technician Details 300

| Employee ID | Employee Name | Biometric - Face | Biometric - Fingerprint | ID Created Date | Role |
|---|---|---|---|---|---|
| 139 | Elena Jenkins |  |  | 10/4/2016 | Technician – Level 1 |
| 140 | Thomas Edwards |  |  | 12/9/2016 | Technician – Level 1 |
| ... | ... | ... | ... | ... | ... |
| 178 | Michael Lane |  |  | 1/2/2017 | Administrator |

| Maintenance Task ID | Traffic Signal ID | Employee ID | Start Time | End Time |
|---|---|---|---|---|
| 1 | X123 | 141 | 4/13/2017 10:30:00 | 4/13/2017 12:30:00 |
| 2 | A937 | 146 | 4/13/2017 16:30:00 | 4/13/2017 17:30:00 |
| 3 | Z456 | 143 | 4/13/2017 10:30:00 | 4/13/2017 13:30:00 |
| 4 | E231 | 144 | 4/15/2017 10:30:00 | 4/15/2017 12:30:00 |
| 5 | B678 | 141 | 4/18/2017 10:30:00 | 4/18/2017 12:30:00 |
| 6 | H456 | 142 | 4/20/2017 12:30:00 | 4/21/2017 13:30:00 |
| ... | | | | |
| N | N354 | 156 | 4/22/2017 16:30:00 | 4/22/2017 17:30:00 |

FIG. 4

| Change ID | Date | Traffic Signal ID | Changes file | Approval Status | Expire Date |
|---|---|---|---|---|---|
| 1 | 10/4/2016 | Z456 | Cr1.dat | Pending | 10/5/2016 |
| 2 | 10/5/2016 | E231 | Cr2.dat | Approved | 10/6/2016 |
| 3 | 10/6/2016 | B678 | Cr3.dat | Pending | 10/7/2016 |
| 4 | 10/7/2016 | H456 | Cr4.dat | Pending | 10/8/2016 |
| 5 | 10/8/2016 | X123 | Cr5.dat | Approved | 10/9/2016 |
| ... | ... | | | | |
| N | 10/23/2016 | A987 | CrN.dat | Pending | 10/24/2016 |

MODIFYING OPERATIONAL SETTINGS OF A TRAFFIC SIGNAL

CROSS-REFERENCE TO RELATED APPLICATIONS

The present application claims priority benefit of U.S. provisional patent application No. 62/664,002 filed Apr. 27, 2018 the disclosure of which is incorporated by reference.

BACKGROUND OF THE INVENTION

1. Field of Invention

The present disclosure generally relates to a traffic signal control system. More specifically the present disclosure is directed to systems and methods for modifying operational settings of a traffic control cabinet and its components.

2. Description of the Related Art

Traffic signals are used to control and guide movement of traffic. Traffic signals are generally installed at intersections of roads and pedestrian crosswalks. Timings of the traffic signals may be programmed based on the volume of traffic expected to cross the intersection and traffic signal timing may be changed as the volume of traffic passing through the intersection changes over time. In peak commute hours, high traffic volumes may lead to traffic congestion and delayed transit times. Optimally, the timing of the traffic signals may be adjusted dynamically to control the traffic at different times. Generally, authorized traffic personnel may set the timing schedule on a traffic signal controller located within a traffic control cabinet or modify or repair other components of the traffic control system located inside the traffic control cabinet.

Access to traffic control cabinets are generally secured using a lock that can only be opened by authorized personnel. Typically, a physical key must be used to open traffic signal control cabinet locks. In certain instances, however, a situation may arise that requires currently unauthorized personnel to access to a traffic signal control cabinet such that a repair or update may be quickly performed. For example, in an instance when a failure in a traffic controller must be repaired at a time when experienced repair technicians are not available, another more junior technician may have to be allowed access to the failing traffic controller such that the repair can be expedited. This more junior technician, however, may not have access to a physical key that may be required to access components that are located within a traffic control cabinet.

What are needed are systems and methods that allow individuals to gain access to traffic control cabinets in new ways. What are needed are systems and methods where the status of personnel may be updated dynamically in a manner that allows currently unauthorized personnel to access traffic control cabinets when a need arises. Such situations may require that a status assigned to a junior technician be updated to an authorized status when there is an urgent need to repair a traffic control signal controller. Such situations may also require an automated system that allows personnel to access traffic control cabinets even when physical keys are not accessible.

While, allowing a junior employee to access traffic control signal cabinets may provide benefits, such actions come with a risk that the junior employee may inadvertently make changes that cause unintentional traffic disruptions. Furthermore, even more experienced employees may make changes to traffic timing parameters that negatively impact traffic flow. As such, there is also a need for intelligent systems that quickly identify when updates to traffic signal timing result in increased traffic congestion such that corrections can be made to mitigate the effects of human error such that traffic congestion can be minimized.

SUMMARY OF THE PRESENTLY CLAIMED INVENTION

The presently claimed invention relates to a method, a non-transitory computer-readable storage medium, and a system that allows configurations at a traffic signal light controller to be updated. A method consistent with the presently claimed invention may include receiving personal biometric data, comparing the received biometric data with information stored in a database, and identifying an authorization privilege of a person based on information retrieved from a database that cross-references the retrieved database information with the personal biometric data. The method of the presently claimed invention may also allow the person to update a configuration at the traffic signal light controller according to the authorization privilege.

When the presently claimed invention is implemented as a non-transitory computer readable storage medium, a process executing instructions out of a memory may implement a method consistent with the present disclosure. Here again the method may include receiving personal biometric data, comparing the received biometric data with information stored in a database, identifying an authorization privilege of a person based on information retrieved from a database that cross-references the retrieved database information with the personal biometric data, and allowing the person to update a configuration at the traffic signal light controller according to the authorization privilege.

A system consistent with the presently claimed invention may include a traffic signal light controller and a computer that are communicatively coupled to each other. The traffic signal light controller may receive personal biometric data and may send that personal biometric data to the computer. After the computer receives the personal biometric data, the computer may compare that biometric data with information stored in a database after which the computer may identify an authorization privilege associated with a person. The computer may then allow an updated configuration to be initiated according to the authorization privilege based on information that cross-references the received biometric information with the authorization privilege.

BRIEF DESCRIPTION OF THE DRAWINGS

FIG. 4 includes a table of information that may be stored in a maintenance database consistent with the present disclosure.

FIG. 5 includes a table of information that may be stored in a temporary change database consistent with the present disclosure.

DETAILED DESCRIPTION

The present disclosure is directed to methods and apparatus that manage the flow of traffic. Methods and systems consistent with the present disclosure may allow biometric information of individuals to be collected when access privileges associated with particular individuals are validated or updated. These methods may allow a supervisor to temporarily or permanently authorize certain employees to access components that are located within a traffic control cabinet and these methods may allow changes in traffic signal light timing to be authorized according to a set of rules. Such authorization rules may require proposed signal light timing changes to be approved by a supervisor before a proposed change is implemented. Methods and systems consistent with the present disclosure may also cause components within a control cabinet to be disabled or disconnected when a signal light control cabinet is accessed by unauthorized persons.

Figure 1:
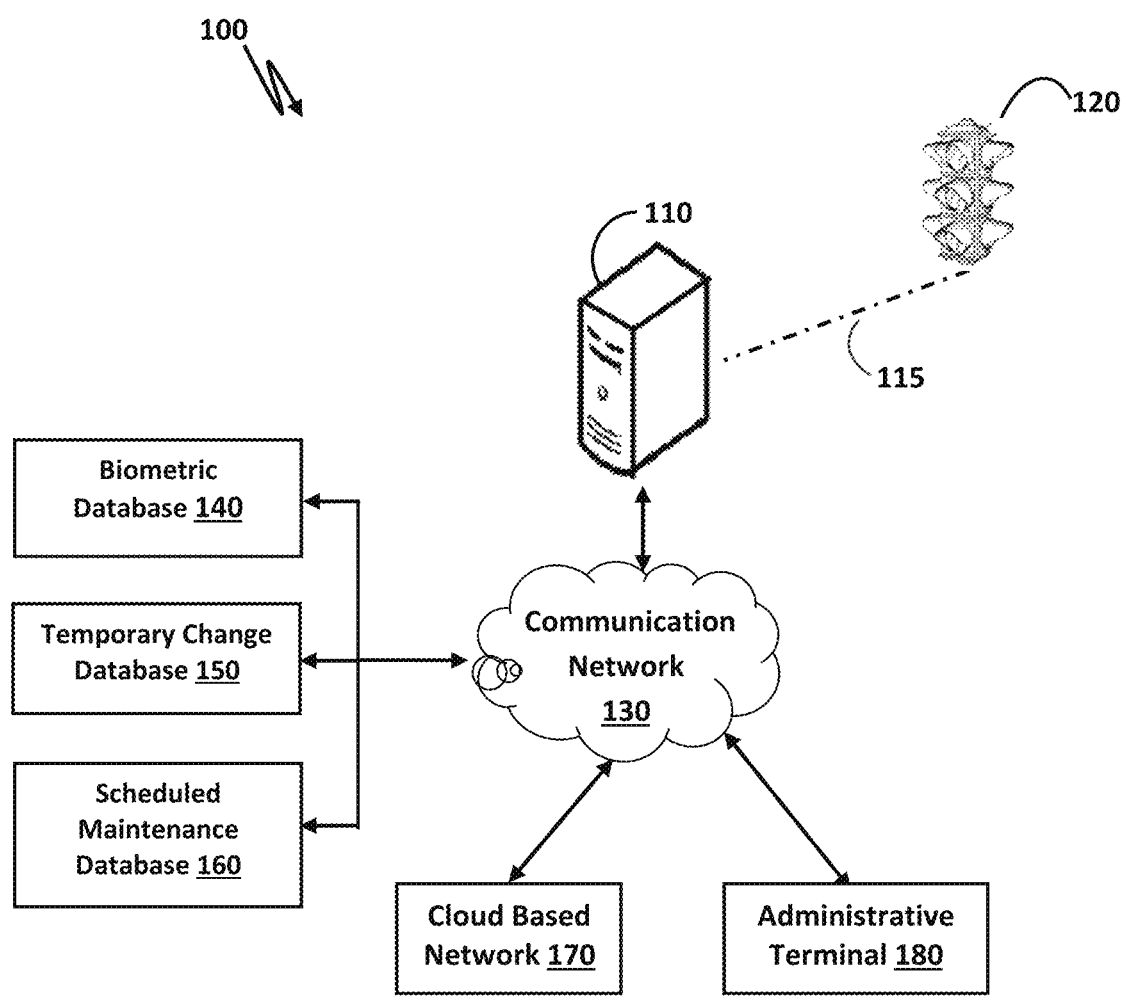
FIG. 1 illustrates a system that controls the operation of traffic signals.

FIG. 1 illustrates a system that controls the operation of traffic signals. The system 100 of FIG. 1 includes computer 110, traffic signals controller/traffic control cabinet 120, communication network 130, biometric database 140, a temporary change database 150, scheduled maintenance database, cloud based network 170, and an administrator terminal 180. Computer 110 may communicate with biometric data base 140, temporary change database 150, and scheduled maintenance databased 160 traffic signals controller 120 via communication network 130. Computer 110 may also communicate with devices in cloud based network 170 and with administrative terminal 180 via communication network 130. While computer 110 is illustrated as communicating with traffic signals controller 120 via communication channel 115, computer 110 may additionally or alternatively communicate with traffic signal controller 120 via communication network 130.

System 100 may implement a method that modifies operational settings of traffic controller 120. These operational settings may control the timing and sequences of a traffic signal controlled by traffic controller 120. In operation, computer 110 may communicate with temporary change database 150 to access or update temporary modifications to the operational settings of traffic controller 120. Temporary change database 150 may be updated to store a change that gives priority to a particular direction of travel. For example, when the President of the USA visits a city, the movement of the Presidential motorcade may be given priority after an operator configures and stores updates to temporary change database 150. Updates to the temporary change database 150 may be made via administrative terminal 180 after user credentials of the operator have been authenticated. A method for authenticating the operator may include the operator providing a biometric input via administrative terminal 180, this method may include a computer accessing biometric database 140 when that computer authenticates the identity of the operator.

When programming updates to temporary change database 150, the operator may enter new settings that result in signal lights in a particular direction to turn green to allow for the President's motorcade to move through a city without stopping. After a certain time or after the President's motorcade has passed through portions of the city, traffic signal timings may revert back to normal settings. In certain instances, temporary change database 150 may store temporary adjustments to traffic timing over any time span. For example, the timing of traffic signals proceeding to or departing from Super Bowl Stadium may be programmed months in advance. This programming may allow traffic flowing toward the stadium to encounter fewer red lights before the game and may allow traffic flowing away from the stadium to encounter fewer red lights after the game ends.

The scheduled maintained database 160 may store information that identifies dates when certain types of maintenance should be performed to a traffic control system. The maintenance schedule database 160 may be programmed with dates when preventative maintenance checks or other preventative measures should be performed. Alternatively or additionally, maintenance schedule database 160 may be updated when a fault is detected or after maintenance personnel enters information into maintenance database 160. In an example, maintenance database 160 may be updated automatically after a camera captures an image of a particular signal when that particular signal fails to illuminate properly. A user device belonging to a maintenance technician may be sent a message that instructs the technician to repair the failing signal immediately after computer 110 receives the captured image and identifies that the signal has failed to illuminate properly. For example, when signal state information equals "RED" and when the captured image does not include a red indicator at the signal being illuminated, the failure of the red indicator at the signal may be automatically identified by computer 110.

Communication network 130 may also be communicatively coupled to cloud-based network 170. In certain instances, methods and apparatus consistent with the present disclosure may be implemented in the cloud-based network 170. For example, any or all of the databases illustrated in FIG. 7 may reside in the cloud-based network 170. Computer 110 may also be communicatively coupled to an administrative terminal 118 via the communication network 130.

Communication network 130 may be a wired and/or a wireless network. Exemplary wireless network include, yet are not limited to networks that use visible light communications (VLC), worldwide interoperability for microwave access (WiMAX), long term evolution (LTE), wireless local area network (WLAN), infrared (IR), public switched telephone network (PSTN), radio waves, or other wireless communication technologies known in the art.

Figure 2:
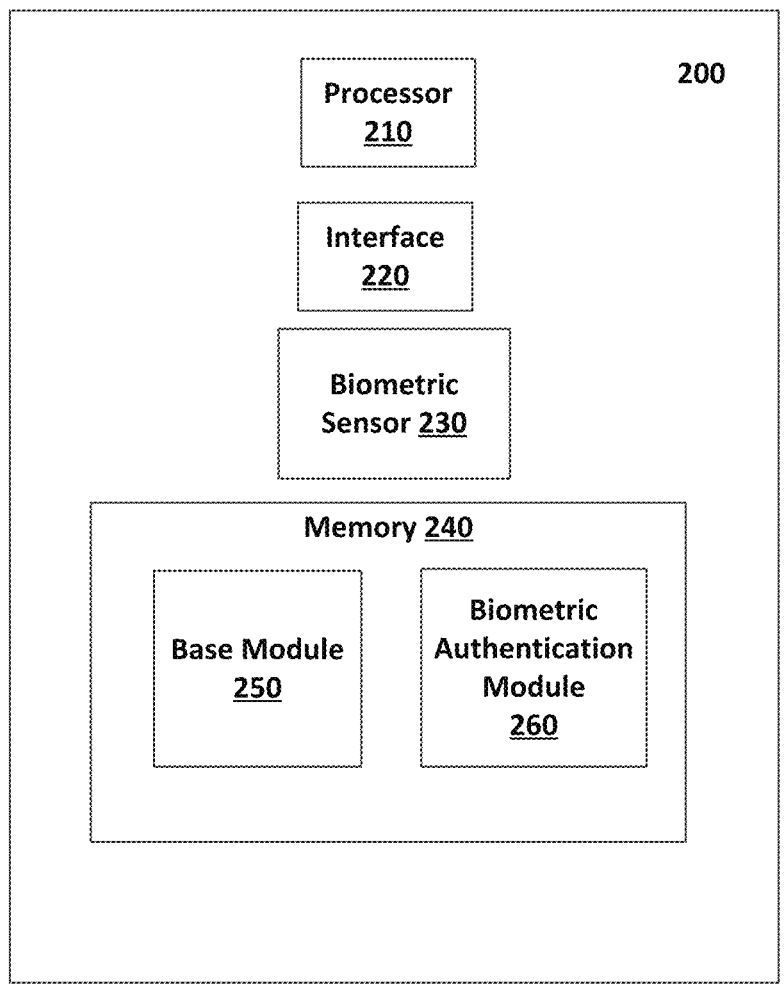
FIG. 2 illustrates components that may be included in a computer that collects and validates biometric information of authorized administrators or maintenance personnel.

FIG. 2 illustrates components that may be included in a computer that collects and validates biometric information of authorized administrators or maintenance personnel. Computer 200 of FIG. 2 includes processor 210, interface 220, biometric sensor 230, and memory 240. Memory 240 may store instructions associated with base module 250 and biometric authentication module 260. Processor 210 may receive biometric data captured by biometric sensor 230 after which processor 210 may access a biometric database according to instructions of biometric authentication module 260 when the identity of an operator is authenticated. This authentication process may include matching the biometric data received from biometric sensor 230 with data retrieved from the biometric database.

Program code of base module 250 may be executed by processor 210, when processor 210 communicates with traffic signal controller 120 of FIG. 1. Processor 210 may receive information from an administrative terminal, may access one or more databases, and may set or update settings that control the timing sequence of a traffic signal. Processor 210 may be configured to decode and execute instructions received from one or more other electronic devices or server(s). Processor 210 may include one or more general-purpose microprocessors (e.g., INTEL® or Advanced Micro Devices® (AMD) microprocessors) or one or more special purpose processors (e.g., digital signal processors, digital logic, a system on chip (SOC) device, or a field programmable fate array (FPGA)). Processor 210 may be configured to execute one or more computer-readable program instructions out of memory 240.

Interface 220 may be a user interface or communication interface that allows information to be received from an operator. Interface 220 may receive modifications to operational settings of a traffic cabinet. Interface 220 may accept inputs from authorized operators or may provide information to authorized operators. Interface 210 may receive commands via a command line interface (CLI), a graphical user interface (GUI), or via a voice interface. When voice data is received via interface 220, processor 210 may execute instructions out of memory 240 when identifying commands spoken by an authorized operator.

Memory 240 may include or be comprised of one or more types of memory, such as hard disk drives, FLASH memory, magnetic tape, floppy diskettes, optical disks, compact disks, read-only memory (ROM/CD-ROM), magneto-optical disks, semiconductor memories, random access memory (RAM), Programmable Read-Only Memories (PROMs), erasable PROMs (EPROMs), electrically erasable PROMs (EEPROMs), magnetic cards, optical cards, or other type of machine-readable medium suitable for storing instructions executable by a processor.

Figure 3:
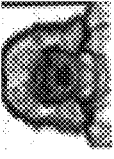
FIG. 3 illustrates a table of information that may be stored in a biometric database consistent with the present disclosure.
Figure 3:
Figure 3:
Figure 3:
Figure 3:
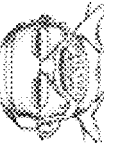
Figure 3:

FIG. 3 illustrates a table of information that may be stored in a biometric database consistent with the present disclosure. Table 300 of FIG. 3 includes information that cross-references employee identification (ID) numbers with employee names, biometric face images, fingerprint data, dates that identify when the employee ID number was created, and jobs or roles associated with each respective employee. Table 300 identifies that employee ID number 139 is assigned to Elena Jenkins. Table 300 also stores a facial image and fingerprint of Elena Jenkins. Table 300 includes information that cross-references Elena's employee ID with an ID creation data of Oct. 4, 2016. Furthermore, table 300 includes information that identifies Elena's current job (level 1 technician). Table 300 also includes employee information associated with employees Thomas Edwards and Michael Jane.

A processor executing instructions out of a memory may access data stored in table 300 when the identity of an employee is authenticated. This authentication process may include receiving a biometric, receiving employee an identification (ID) number, accessing biometric information associated with the received employee ID number, and may include matching the received biometric with biometric data (face image or fingerprint) stored in table 300. When information stored in table 300 matches information provided by an employee, that employee may be allowed to change settings or to update maintenance information according to access privileges associated with that employees job function. For example, Elena and Thomas may be allowed to make entries into a maintenance database, yet may not be authorized to change signal timing based on rules that allows technicians to update the maintenance database and that do not allow technicians to change signal timing. In another example, Michael Jane may be allowed to enter updates into the maintenance database and Michael may be allowed to change signal timing based on one or more rules that allow administrators to update the maintenance database and to make changes to signal timing.

FIG. 4 includes a table of information that may be stored in a maintenance database consistent with the present disclosure. Table 400 of FIG. 4 cross-references maintenance task ID numbers with traffic signal ID numbers, employee ID numbers, maintenance task start times, and maintenance task end times. Initially the start and end times may be set to identify estimated start and end times of particular maintenance tasks and those start and end times may be updated to identify times when particular tasks were really started or ended. While not illustrated in table 400, a maintenance database may also store particular tasks that are scheduled or that were performed by particular employees. For example, table 400 identifies that maintenance task 1 was performed on signal X123 by employee 141 on Apr. 11, 2017 from 10:30 am to 12:30 pm.

The scheduled maintenance database 112 of FIG. 1 may contain information about maintenance tasks created by an administrator for particular traffic signals. In certain instances, a maintenance schedule may allow an administrator to identify that a traffic cabinet has been accessed when a maintenance function has not been scheduled. For example, a sensor that senses that a door of a signal controller has been opened at a particular signal at a time that does not correspond to a time included in table 400 may be used to identify that the door of the signal controller has been opened at an unauthorized time.

In certain instances, each maintenance task in table 400 may be assigned a unique maintenance task ID. Such maintenance task IDs may be automatically generated when new maintenance task information is entered by an administrator. For example, an administrator may schedule employee 146 to repair traffic signal A987 on Apr. 13, 2017 and the administrator may also enter an estimated start and end time for that particular maintenance task to be performed. As soon as the administrator begins entering information relating to the repair of traffic signal A987, this new task may be automatically assigned maintenance task ID number 2, for example.

FIG. 5 includes a table of information that may be stored in a temporary change database consistent with the present disclosure. Table 500 of FIG. 5 cross-references change ID numbers to dates, traffic signal ID numbers, change file data (Cr1.dat through CrN.dat), approval status, and to expiration dates. Note that table 500 indicates that change ID number 1 is tentatively scheduled to be performed on traffic signal Z456 on Oct. 4, 2016. The tentative status of change ID number 1 is indicated by the approval status of change ID number 1 being assigned a pending status. In an instance when the approval status of task ID number 1 is changed to being approved, operation characteristics/signal timing associated with traffic signal Z456 may be configured to operate using data from change file Cr1.dat beginning on Oct. 4, 2016. Furthermore, a processor controlling operation of signal Z456 may cause timing sequences for traffic signal Z456 to revert back to normal timing sequences on Oct. 5, 2016 after the processor identifies that the timing changes associated with change file Cr1.dat should expire on Oct. 5, 2016. While not illustrated in FIG. 5, timing sequences associated with particular signals may also be coupled to particular start and expire times. Data included in table 500 of FIG. 5 and data files Cr1.data through CrN.dat may be stored in the temporary change database 150 of FIG. 1.

As mentioned above, the pending status may indicate that a particular change is awaiting approval by authorized personnel. Alternatively, this pending status may be used to indicate that changes to particular signal light timings were attempted without a successful authentication process having been completed. In an instance when an expiration date is encountered when an approval status is still pending, any changes included in a respective change file may be classified as an unauthorized change. As such, entries in a temporary changes database may be used to identify change requests that were not accepted by authorized employees of an organization chartered with administrating changes to traffic signal light timing.

Figure 6:
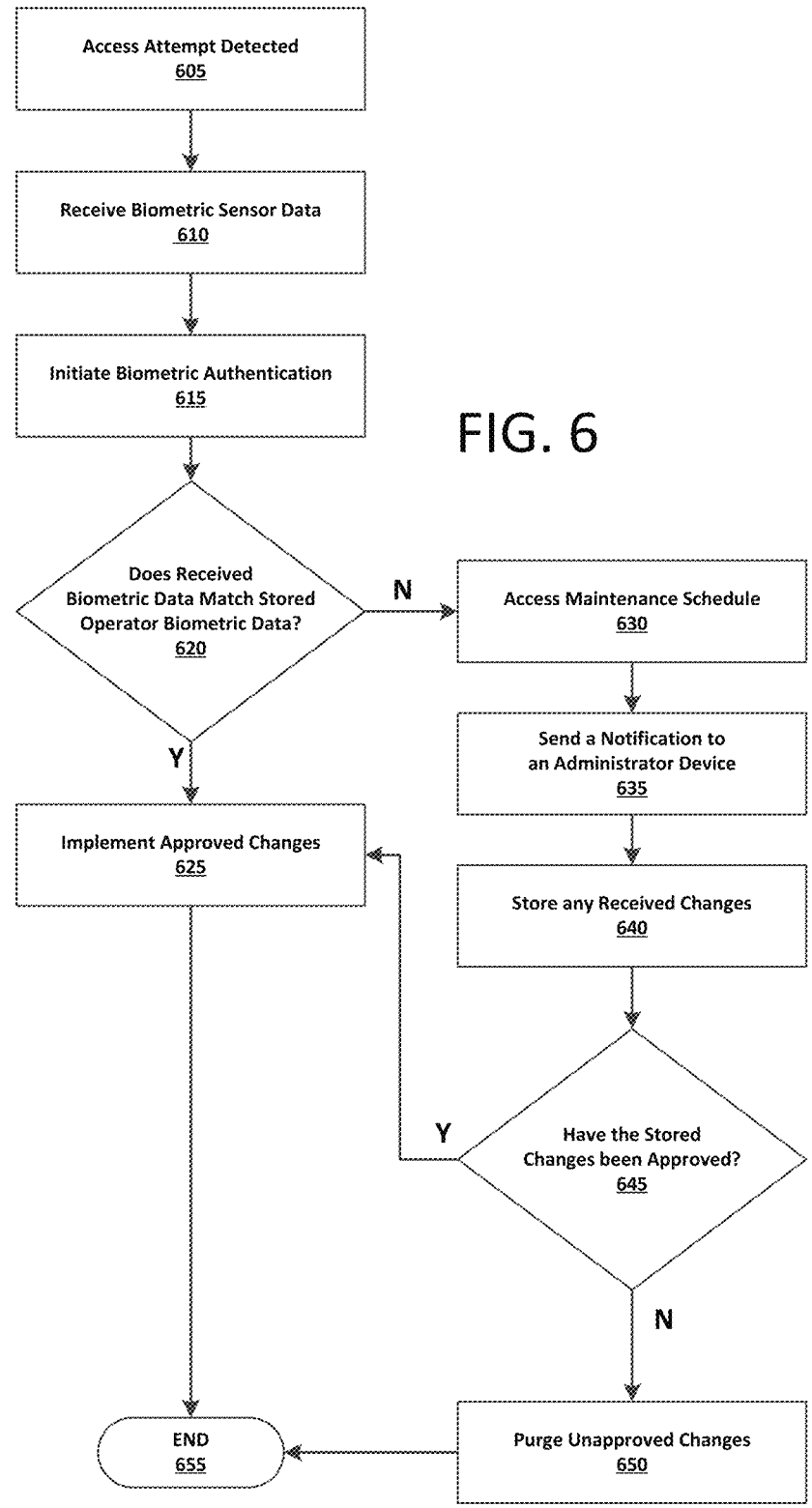
FIG. 6 illustrates steps that may be performed by a processor executing instructions out of a memory to perform functions consistent with the present disclosure.

FIG. 6 illustrates steps that may be performed by a processor executing instructions out of a memory to perform functions consistent with the present disclosure. The steps illustrated in FIG. 6 may be performed by a set of program code that may be referred to as a base software module. The program code illustrated in FIG. 6 begins with step 605 where an access attempt is identified. Such access attempts may be related to a person physically accessing a traffic control cabinet or may relate to detecting that settings that control traffic signal timing have been updated. As such, an access attempt may include receiving a set of updated settings from a user or employee. Alternatively or additionally, access attempts may be identified by a processor that receives sensor data. For example, a processor may receive data from one or more sensors when a person approaches a traffic signal control box or the processor may identify that a door of the traffic signal control box has been opened by monitoring the status of a sensor coupled to a door of a traffic signal control box. Sensors consistent with the present disclosure may include proximity sensors or may include other sensors that detect a switch position, for example. In an instance when updated settings have been received via a user interface or via a communication interface, an identification may be performed that determines whether the person attempting to change these settings is a user is authorized to approve the implementation of updated settings.

After the access attempt is detected in step 605, biometric sensor data may be received in step 610 of FIG. 6. The receipt of this biometric information may be acquired automatically, for example by a camera that takes a picture of the person that has approached a traffic signal control cabinet. Alternatively, the received biometric data may be received via a fingerprint scanner associated with the traffic signal control cabinet. Next, in step 615, a biometric authentication process may be initiated. This authentication process may include comparing the received biometric sensor data to biometric data stored in a database. After step 615, determination step 620 of FIG. 6 may identify whether the received biometric data matches stored biometric data of an operator that is authorized to set the status of received settings to an approved state. When determination step 620 identifies that the received biometric data matches stored biometric data of the authorized operator, program flow may move to step 625 where the approved changes may be implemented. As mentioned above approved changes may be implemented according to a date or time schedule stored in table 500 of FIG. 5. After step 625, program flow may end in step 655 of FIG. 6.

When determination step 620 identifies that the received biometric does not belong to an operator that is authorized to change received settings to the approved state, program flow may move to step 630 where a maintenance schedule may be accessed. Step 630 may query a schedule maintenance database to identify whether a maintenance event has been scheduled for a particular traffic signal controller. Then, in step 635 of FIG. 6, a notification may be sent to a device belonging to an administrator. This administrator may be authorized to approve timing change requests or may be responsible to monitor maintenance activities. In certain instances, an administrator may be presented with an interface that includes the table of FIG. 5 in step 635 of FIG. 6. The administrator may add unauthorized personnel to list of authorized operators after receiving the notification sent in step 635. As such, the status of a particular employee may be updated when needed. Furthermore, such updates to an employee's status may be temporary.

After step 635, a processor may store any received any received changes, setting updates, or change data files in step 640. Next, determination step 645 may identify whether the changes stored in step 640 have been approved by the administrator or other authorized entities, when yes, program flow may move to step 625 where the approved changes are implemented. When determination step 645 identifies that the stored changes have not been approved, program flow may move to step 650 where any unapproved changes may be purged or deleted. Alternatively, unapproved changes may be associated with an unauthorized status without deleting the unapproved changes from memory. Next, program flow may end at step 655 of FIG. 6.

Figure 7:
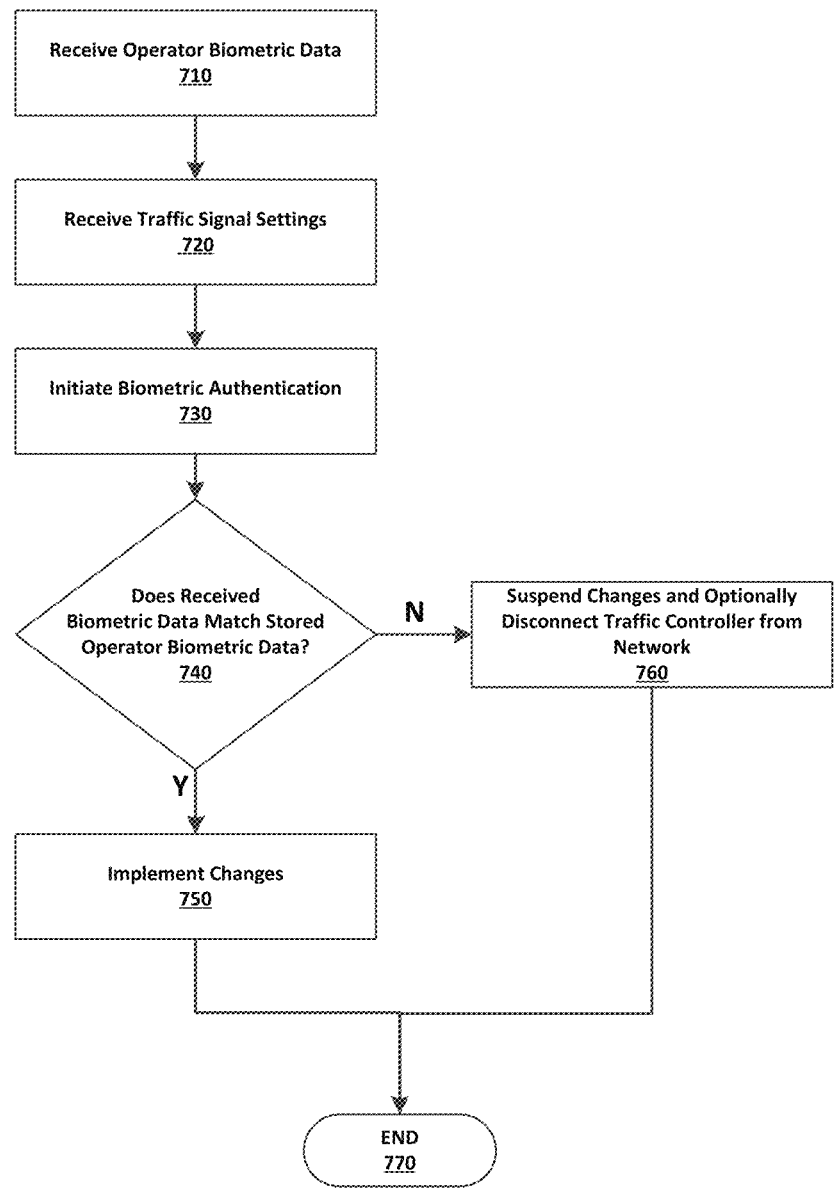
FIG. 7 illustrates steps consistent with a method for updating settings or actions performed by a traffic control cabinet consistent with the present disclosure.

FIG. 7 illustrates steps consistent with a method for updating settings or actions performed by a traffic control cabinet consistent with the present disclosure. FIG. 7 begins with step 710 that receives operator biometric information. Next, in step 720, new traffic signal settings may be received. These traffic settings may be received via a command line interface, via a graphical user interface, or may be received as a data file. When new traffic settings are received as a data file, that data file may include a series of sets of settings that change by the time of day. These new settings may increase the duration of an amount of time associated with allowing traffic to flow into a city in the morning, for example. Entries in a data file may also cause traffic signal timing to change to other settings after 10:00 am in the morning and may cause traffic signal timing to change again to yet other settings after 3:00 pm in the afternoon. Alternatively or additionally, a data file may also include commands that affect signal timings before and after a scheduled event.

Next, in step 730, of FIG. 7 a process that authenticates the received biometric may be initiated. Here again, this authentication process may include retrieving data from a database and may include comparing the received biometric data with the data retrieved from the database. Determination step 740 may then identify whether the receive biometric data matches the data retrieved from the database, when yes, program flow may move to step 750 where the received setting changes may be implemented. When determination step 740 identifies that the received biometric data does not match data associated with an authorized operator, program flow may move to step 760 where any of the setting changes received in step 720 may be suspended or deleted. Optionally, the traffic signal controller associated with the received traffic signal changes may be disconnected from the traffic controller network. Alternatively, when determination step 740 identifies that the biometric data does not match data associated with an authorized operator, a determination may be made that the person attempting to change traffic settings is an unauthorized person and further input from that unauthorized person may be blocked. After step 750 or step 760, program flow may end in step 770 of FIG. 7.

Figure 8:
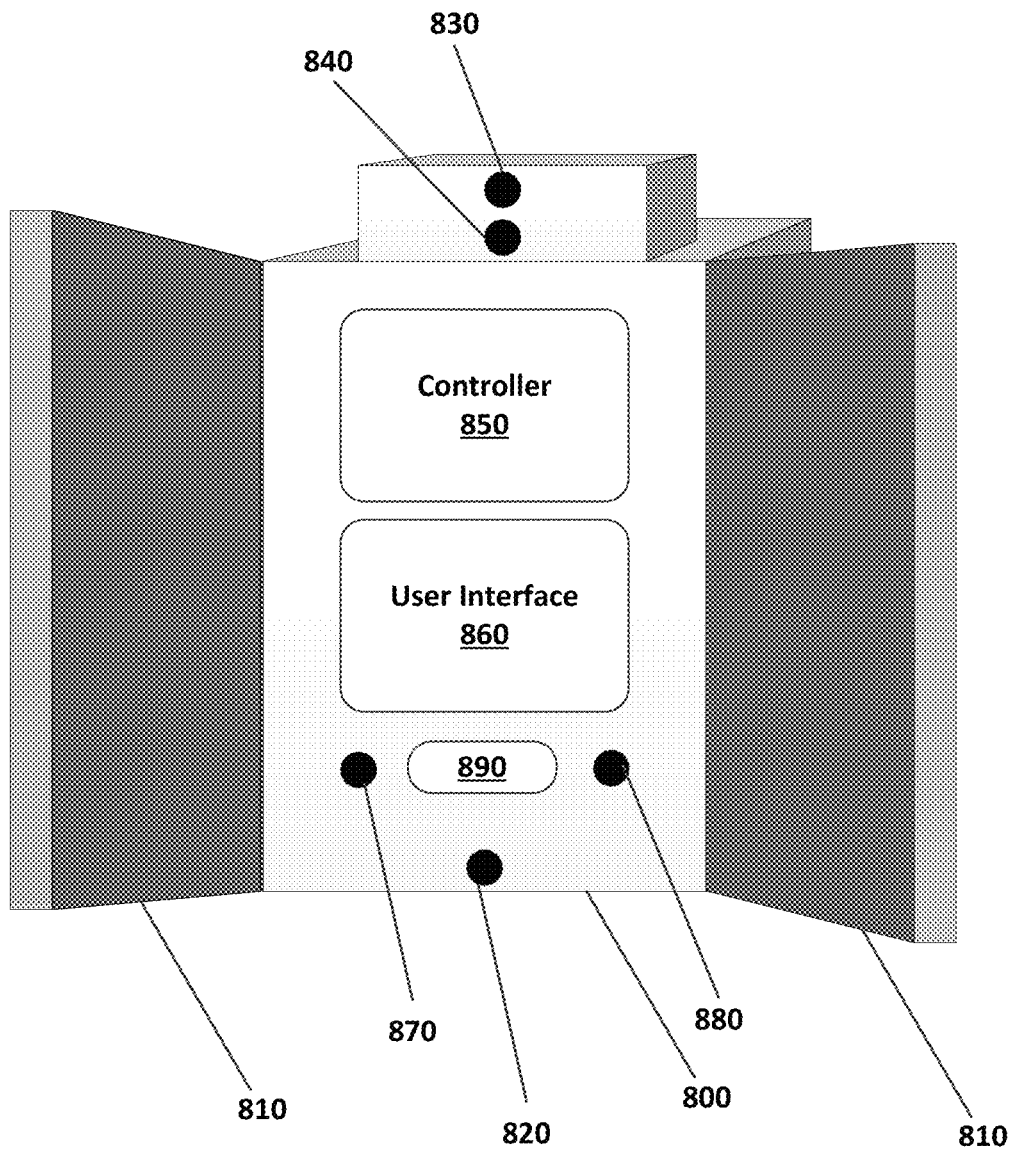
FIG. 8 illustrates an exemplary control cabinet or box that may house a traffic controller consistent with the present disclosure.

FIG. 8 illustrates an exemplary control cabinet or box that may house a traffic controller consistent with the present disclosure. FIG. 8 includes control cabinet (box) 800 that includes doors 810, open/closed door sensor 820, proximity sensor 830, camera 840, controller (or computer) 850, user interface 860, speaker 870, microphone 880, and fingerprint scanner 890. Controller 850 may be communicatively coupled with, open/closed door sensor 820, proximity sensor 830, camera 840, user interface 860, speaker 870, microphone 880, and fingerprint scanner 890. When a person approaches control cabinet 800, controller 850 may receive sensor data from proximity sensor 830 after which an image of a person may be acquired from camera 840. The receipt of this sensor and image data may cause controller 850 to initiate an identification of the person that approached the control box. This authentication process may be performed by controller 850 or may be performed by an external computer that receives camera image data from controller 850. Alternatively or additionally, sensor data from the open/closed door sensor 820 may be received by controller 850 when controller 850 identifies that doors 810 of control cabinet 800 have been opened. Here again camera 840 may acquire an image of a person based on the receipt of sensor data or fingerprint scanner 890 may be used to acquire fingerprint data from the person accessing cabinet 800. Controller 850 may then perform an authentication process or this authentication process may be performed by an external computer after biometric (image, fingerprint, or voice) data has been sent the external computer. When a user is authenticated using voice data, voice recognition software at controller 850 or at the external computer may be used to authenticate the user after the user speaks a phrase into microphone 880.

After an authentication has been performed a user may enter information or settings via user interface 860 or via a keyboard not illustrated in FIG. 8. Alternatively or additionally, the authenticated user may copy or download timing sequence instructions/files that may control operation of traffic signal lights controlled by controller 850. Speaker 870 may be used to provide audio instructions or questions to the person accessing control cabinet 800. Microphone 880 may be used to provide audio (verbal) commands to controller 850. Microphone 880 may be used by the person accessing control cabinet 800 when that person is engaged in a conversation with a supervisor located at another location. Controller 850 may be used to implement portions of or all of the steps discussed in respect to the various flow charts included in the present disclosure.

Figure 9:
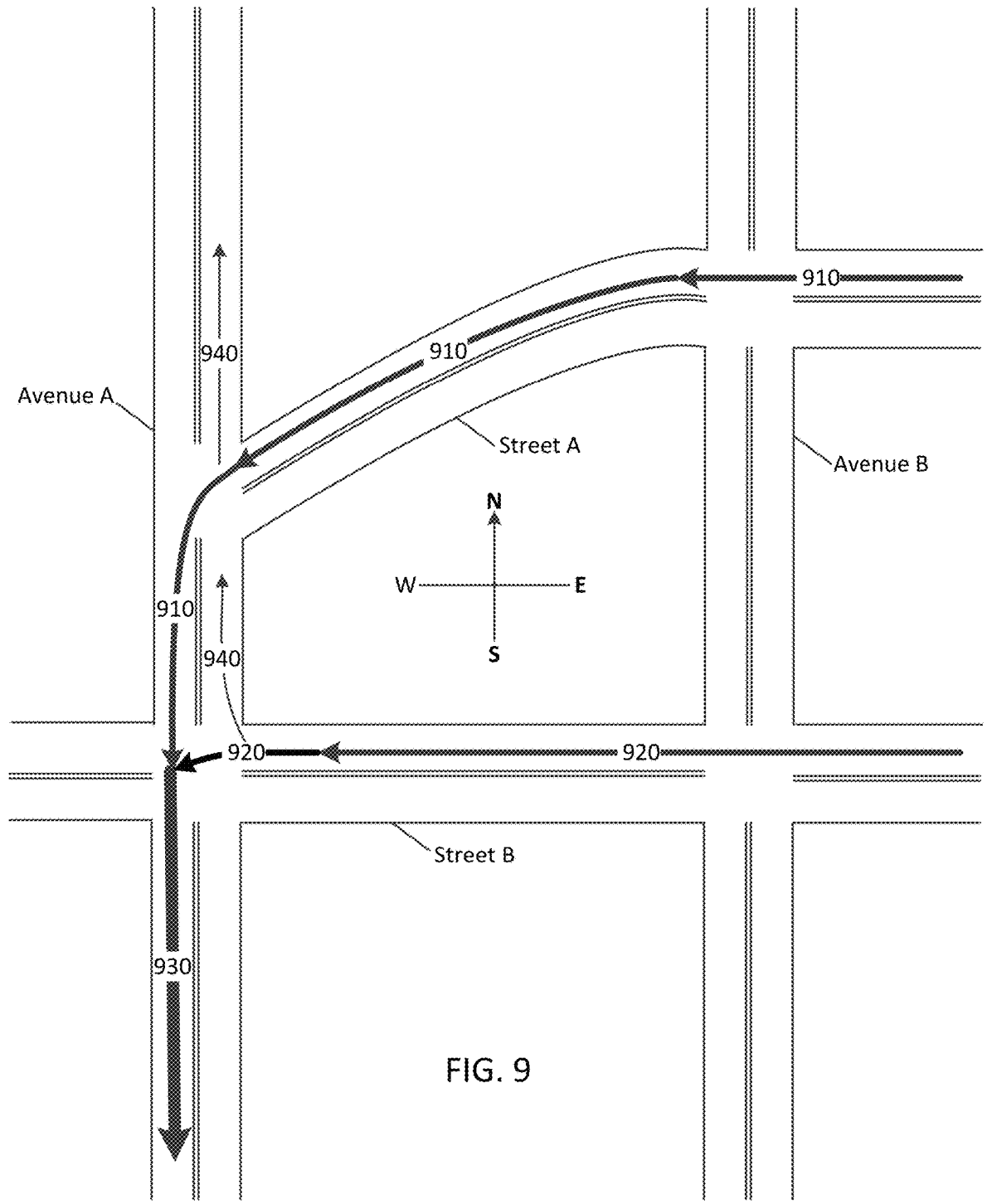
FIG. 9 illustrates major traffic flows along roadways in a city during commute time.

FIG. 9 illustrates major traffic flows along roadways in a city during commute time. FIG. 9 includes roadways of street A, street B, avenue A, and avenue B. FIG. 9 also includes a compass with points N, S, E, and W that respectively identify a Northern, a Southern, an Eastern, and a Western direction. Note that most of traffic flow 910 flows along street A into avenue A toward the Western direction. Note also that most of traffic flow 920 flows along street B into avenue A in the Western direction. Most of traffic flow 910 and 920 converge into avenue A forming traffic flow 930 at the intersection of street B and avenue A. Note also that traffic flow 930 flows in the Southern direction and that some of traffic flow 920 turns into traffic flow 940 that flows in the Northern direction along avenue A. Note that each of the traffic flows 910, 920, 930, and 940 each have different thicknesses. These thicknesses may correspond to an amount of traffic currently flowing along a particular path, where thicker lines correspond to heavier (increased) traffic. Methods and systems consistent with the present disclosure may be used to collect information relating to traffic flow in particular directions along particular roadways. This traffic flow information may be collected by cameras associated with a traffic control system or may be collected by sensors that detect vehicles passing by. Algorithms executed by a computer that sends commands to traffic signal light controllers may use collected vehicle traffic data to modify signal light timing in a manner that helps optimize traffic flow. Signal lights along traffic flow 930 may be biased to allow vehicles traveling along flow 930 to move more freely by increasing the length of time traffic signal lights are in a green state. Signal lights along traffic flows 910 and 920 may also be biased to allow flows 910 and 920 to flow more freely. The timing of lights along traffic flows 910 and 920 may be offset such that traffic flow 910 may proceed without causing a significant congestion along street A. This timing offset may also allow traffic proceeding along flow 920 to proceed along street B without causing significant congestion along street B. In an instance where traffic along flow 920 reduces and when traffic along flow 910 remains at a high level, traffic signal lights along traffic flow 910 may be adjusted to have longer lengths of green signal time than traffic lights along traffic flow 920.

In certain instances, traffic control boxes/cabinets associated with certain traffic signals may adjust their own timing according to data files and algorithms as traffic conditions change. In such instances, a central control system may not command changes to respective individual signal light controllers, yet the central control system may provide data regarding traffic flow at other signal lights. Alternatively, respective traffic signal light controllers may communicate with each other as peers in a peer-to-peer computing environment where different signal light controllers communicate traffic flow data to other signal light controllers along particular roadways. As such, method and systems consistent with the present disclosure may be controlled in part by a central control system or may operate more independently using information received from a central control system or from other signal light controllers.

Figure 10:
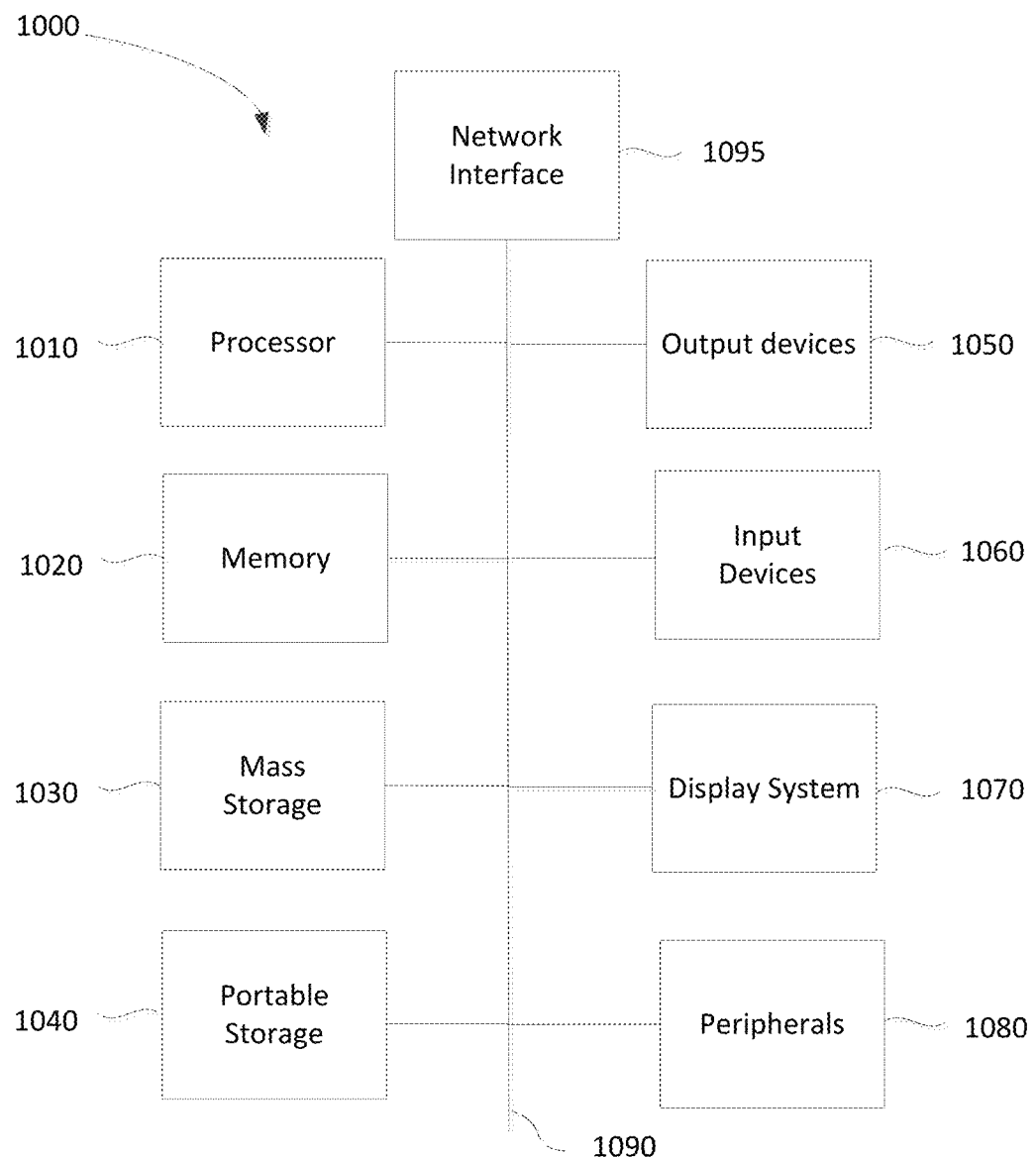
FIG. 10 illustrates a computing system that may be used to implement an embodiment of the present invention.

FIG. 10 illustrates a computing system that may be used to implement an embodiment of the present invention. The computing system 1000 of FIG. 10 includes one or more processors 1010 and main memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, peripheral devices 1080, and network interface 1095.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a FLASH memory, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD), a plasma display, an organic light-emitting diode (OLED) display, an electronic ink display, a projector-based display, a holographic display, or another suitable display device. Display system 1070 receives textual and graphical information, and processes the information for output to the display device. The display system 1070 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1080 may include any type of computer support device to add additional functionality to the computer system. For example, peripheral device(s) 1080 may include a modem or a router.

Network interface 1095 may include any form of computer interface of a computer, whether that be a wired network or a wireless interface. As such, network interface 1095 may be an Ethernet network interface, a BlueTooth™ wireless interface, an 802.11 interface, or a cellular phone interface.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewellery/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 1000 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

Some embodiments of this disclosure, illustrating all its features. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

What is claimed is:

1. A method of modifying a configuration at a traffic signal controller, the method comprising:
   storing biometric data in a database specific to each of a plurality of persons, wherein each person is further associated with a different authorization privilege;
   receiving biometric data of a person;

comparing the received biometric data of the person with the stored biometric information in the database to identify the person;
identifying an authorization privilege associated with the identified person in the database based on the received biometric information matching the stored biometric information for the person;
allowing the identified person to update the configuration at the traffic signal controller according to the authorization privilege;
querying a maintenance database to check if modifying the configuration at the traffic signal controller is scheduled to be performed; and
sending a notification if the modification is not scheduled.

2. The method of claim 1, further comprising:
identifying that the authorization privilege indicates that the person is currently classified as unauthorized;
sending a message to a computing device associated with a supervising authority; and
receiving an instruction from the computing device associated with the supervising authority that changes the unauthorized classification of the person to an authorized classification, wherein the person is allowed to update the configuration according to the received instruction.

3. The method of claim 2, further comprising changing the authorized classification of the person back to the unauthorized classification after a first time period.

4. The method of claim 3, further comprising receiving data regarding the first time period from the supervising authority computing device.

5. The method of claim 1, further comprising sending a command to the traffic signal controller that causes a door securing the traffic signal controller to open.

6. The method of claim 1, further comprising:
sending information to a supervising authority computing device that identifies the updated configuration; and
receiving an instruction from the supervising authority that approves the updated configuration, wherein the updated configuration is initiated based on the approval.

7. The method of claim 6, wherein initiating the updated configuration modifies a timing of a traffic signal light.

8. The method of claim 1, further comprising receiving communications that identify traffic conditions at one or more roadway intersections, and modifying a timing of a traffic signal light based on the traffic conditions at the one or more roadway intersections.

9. The method of claim 8, wherein the timing of the traffic signal light is modified to increase an amount of time a green light is illuminated at an associated intersection.

10. A non-transitory computer-readable storage medium having embodied thereon a program executable by a processor to perform a method for modifying a configuration at a traffic signal controller, the method comprising:
storing biometric data in a database specific to each of a plurality of persons, wherein each person is further associated with a different authorization privilege;
receiving biometric data of a person;
comparing the received biometric data of the person with the stored biometric information in the database to identify the person;
identifying an authorization privilege associated with the identified person in the database based on the received biometric information matching the stored biometric information for the person;
allowing the identified person to update the configuration at the traffic signal controller according to the authorization privilege;
querying a maintenance database to check if modifying the configuration at the traffic signal controller is scheduled to be performed; and
sending a notification if the modification is not scheduled.

11. The non-transitory computer-readable storage medium of claim 10, further comprising instructions executable to:
identify that the authorization privilege indicates that the person is currently classified as unauthorized;
send a message to a computing device associated with a supervising authority; and
receive an instruction from the computing device associated with the supervising authority that changes the unauthorized classification of the person to an authorized classification, wherein the person is allowed to update the configuration according to the received instruction.

12. The non-transitory computer-readable storage medium of claim 11, further comprising instructions executable to change the authorized classification of the person back to the unauthorized classification after a first time period.

13. The non-transitory computer-readable storage medium of claim 12, further comprising instructions executable to receive data regarding the first time period from the supervising authority computing device.

14. The non-transitory computer-readable storage medium of claim 10, further comprising instructions executable to send a command to the traffic signal controller that causes a door securing the traffic signal controller to open.

15. The non-transitory computer-readable storage medium of claim 10, further comprising instructions executable to:
send information to a supervising authority computing device that identifies the updated configuration; and
receive an instruction from the supervising authority that approves the updated configuration, wherein the updated configuration is initiated based on the approval.

16. The non-transitory computer-readable storage medium of claim 15, wherein the processor initiates the updated configuration to modify a timing of a traffic signal light to be modified.

17. The non-transitory computer-readable storage medium of claim 10, further comprising instructions executable to receive communications that identify traffic conditions at one or more roadway intersections, and modifying a timing of a traffic signal light based on the traffic conditions at the one or more roadway intersections.

18. The non-transitory computer-readable storage medium of claim 17, wherein the timing of the traffic signal light is modified to increase an amount of time a green light is illuminated at an associated intersection.

19. A system for modifying a configuration at a traffic signal controller, the system comprising:
a database in memory that stores biometric data specific to each of a plurality of persons, wherein each person is further associated with a different authorization privilege;
a biometric sensor that receives biometric data of a person; and
a processor that executes instructions stored in memory, wherein execution of the instructions by the processor:

compares the received biometric data of the person with the stored biometric information in the database to identify the person;

identifies an authorization privilege associated with the identified person in the database based on the received biometric information matching the stored biometric information for the person;

allows the identified person to update the configuration at the traffic signal controller according to the authorization privilege;

queries a maintenance database to check if modifying the configuration at the traffic signal controller is scheduled to be performed; and sends a notification if the modification is not scheduled.

20. The system of claim 19, further comprising a traffic signal light, wherein the updated configuration modifies a timing of the traffic signal light.

* * * * *